United States Patent [19]
Hartl et al.

[11] Patent Number: 5,227,860
[45] Date of Patent: Jul. 13, 1993

[54] SAGNAC-TYPE FIBER-OPTIC GYRO WITH 3×COUPLER ARRANGEMENT FOR CONTROLLING INTENSITY AND WAVELENGTH OF LIGHT SOURCE

[75] Inventors: Engelbert Hartl, Munich; Hans Poisel, Dachau; Gert Trommer, Munich, all of Fed. Rep. of Germany

[73] Assignee: Messerschmitt-Böllow-Blohm GmbH, Fed. Rep. of Germany

[21] Appl. No.: 782,300

[22] Filed: Oct. 24, 1991

[30] Foreign Application Priority Data

Nov. 22, 1990 [DE] Fed. Rep. of Germany ....... 4037118

[51] Int. Cl.⁵ .............................................. G01C 19/72
[52] U.S. Cl. ................................................... 356/350
[58] Field of Search ........................................ 356/350

[56] References Cited

U.S. PATENT DOCUMENTS

| | | | |
|---|---|---|---|
| 4,456,376 | 6/1984 | Carrington et al. | 356/350 |
| 4,890,922 | 1/1990 | Wilson | 356/350 |
| 4,944,590 | 7/1990 | Poisel et al. | 356/350 |

*Primary Examiner*—Samuel A. Turner
*Attorney, Agent, or Firm*—Evenson, McKeown, Edwards & Lenahan

[57] ABSTRACT

A Sagnac-type fiber optic gyro having a control and analysis unit which controls the intensity and the center wave length of the light emitted from the light source in such a manner that the ratio of the output signal of the light detector to the output signal of its monitoring detector is constant.

8 Claims, 1 Drawing Sheet

SAGNAC-TYPE FIBER-OPTIC GYRO WITH 3×COUPLER ARRANGEMENT FOR CONTROLLING INTENSITY AND WAVELENGTH OF LIGHT SOURCE

BACKGROUND AND SUMMARY OF THE INVENTION

The invention relates to a fiber-optic gyro, and in particular a fiber optic gyro of the Sagnac type.

Fiber-optic gyros of this generic type are generally known. However, a problem which is encountered with respect to such prior art devices is that changes of the characteristics of the individual components of the fiber-optic gyro, (for example, the light source or the 3×3-coupler constructed of three optically coupled fiber-optic light guides) cause errors in the measurements.

German Patent Document DE 38 05 904 A1 discloses an arrangement to detect changes of the characteristics of the fiber-optic gyro and to make corresponding corrections, by means of a light detector provided on the exit side of the input light guide, and a second detector which monitors the intensity of the light emitted by the light source. Although, this known fiber-optic gyro can detect and eliminate control-caused changes of the light source as well as various changes of the 3×3-coupler, systemic measurement errors continue to occur due to uncorrected changes of the coupling values between the individual fiber-optic light guides.

German Patent Document P 39 12 005.8 discloses a process for signal analysis of a fiber-optic gyro having a 3×3-coupler which provides an improved determination of the rate of rotation despite stochastic fluctuations in contrast of the interference signal to be analyzed. Nevertheless, zero-point drifts and scale factor drifts remain problematic with this fiber-optic gyro as a result of environmentally caused fluctuations of the 3×3-coupler.

It is therefore an object of the present invention to provide an improved Sagnac-type fiber-optic gyro in which the influence of environmental conditions on the 3×3-coupler causes no zero-point drifts and no scale-factor changes.

This object and other objects and advantages are achieved according to the invention, in which a control and analysis unit controls the intensity and the center wave length of the light emitted from the light source in such a manner that the ratio of the output signal of the light detector (and the detector provided on the exit side of the input light guide) to the output signal of the monitoring detector (the detector which detects the intensity of the light emitted by the light source) remains constant, without any interposition of a coupling light guide.

The invention is based on the principal consideration that the three coupling values between the individual ducts of the 3×3 coupler are given by the product of the length of the joint coupling path and the respective coupling constant $k_{ij}$. The coupling constants in turn depend essentially on the distances of the respective light guides from one another, on the wave length of the coupled-in light and on environmental conditions (pressure, temperature, etc.). The individual coupling constants, as recognized according to the invention, have essentially uniform dependency on the environmental conditions of pressure, temperature, etc. as well as the wave length. As a result, as also recognized according to the invention, it is possible to compensate for environmentally caused changes of the coupling constants by a corresponding change of the center wave length of the coupled-in light if, in response to changes in the intensity of the light source, the pertaining center wave length is varied in such a manner that the ratio of the output signal of the light detector to the output signal of the monitoring detector is constant.

For the analysis of the output signals of the two measuring detectors which are mounted on the ends of the additional light guides opposite the fiber-optic coil, it is particularly advantageous for the control and analysis unit to control the intensity and the center wave length of the light emitted by the light source in such a manner that not only is the ratio of the two output signals constant, but also the output signals of the light detector and of the monitoring detector themselves are constant as well. Thus their ratio is naturally also constant.

The variation of the center wave length of the light source may be achieved in a variety of ways. In each instance, however, it is advantageous in view of the overall size, sensitivity, etc. for the light source to be a semiconductor light source, such as an LED, ELED or a semiconductor laser, for which variation of the emitted light may be achieved either by manipulation of the temperature of the semiconductor light source or by variation of the injection current. The temperature of the semiconductor light source may be varied by a tempering element which may be any arbitrary heating and/or cooling device. Especially advantageous for this purpose is a Peltier element, in which heat is generated or absorbed at the junction of two dissimilar metals which carry a small current Other objects, advantages and novel features of the present invention will become apparent from the following detailed description of the invention when considered in conjunction with the accompanying drawings.

DETAILED DESCRIPTION OF THE DRAWINGS

Except with respect to the novel features described in detail below, the structure and function of the elements of the Sagnac-type fiber-optic gyros shown in FIGS. 1 and 2 correspond in general to those described in the German Patent Document DE 38 05 904 A1.

Figure 1:
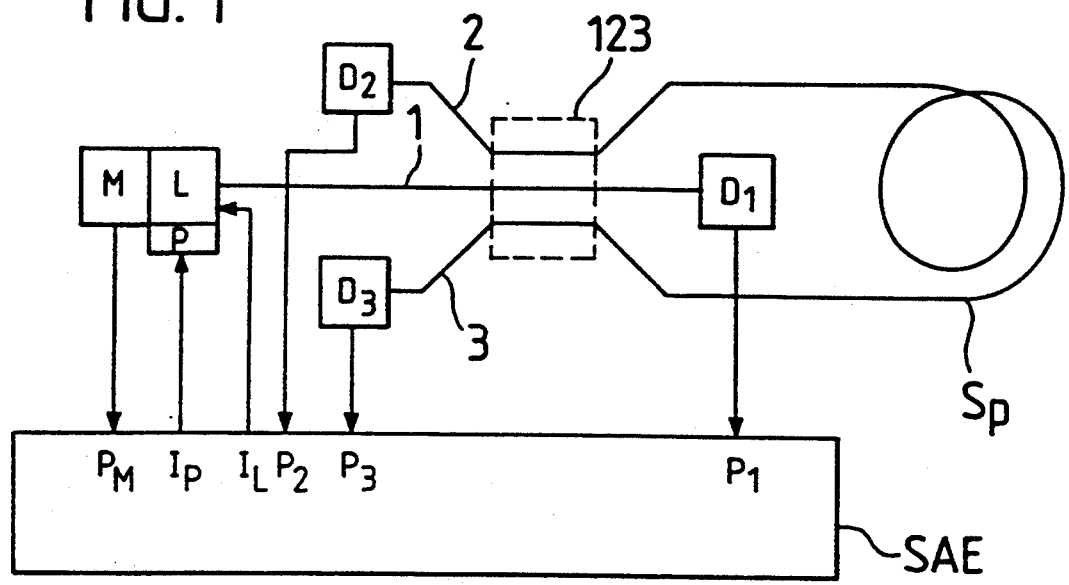
FIG. 1 shows a schematic diagram of a fiber-optic gyro according to the invention.

Referring to FIG. 1 of the drawing; light from a light source L is coupled into an input fiber-optic light guide 1 of 3×3-coupler 123. Coupled at the opposite end of the input light guide 1, is a light detector $D_1$. The 3×3-coupler 123 also has two light guides 2 and 3 adjacent the input light guide 1. The light guides 2 and 3 are each connected with the respective ends of a fiber-optic coil Sp. Measuring detectors $D_2$ and $D_3$ are provided on the other end of the light guides 2 and 3. In addition, a monitoring detector M is provided which "directly" detects the intensity of the light L emitted by the light source L. The output signals ($P_1$ to $P_3$ and $P_m$) of the detectors $D_1$ to $D_3$ and M are fed to the control and analysis unit SAE which determines the rate of rotation of the coil Sp from the individual output signals in the manner described, for example, in the German Patent Document DE 38 05 904 A1 referred to previously.

In the embodiment of the invention illustrated in FIG. 1, a Peltier element P is used to regulate the temperature of the light source (a semiconductor light source, such as an LED, an ELED or a semiconductor laser). When the temperature of the light source is changed, the "center wave length" of the light emitted by the light source is also displaced. Furthermore, the control and analysis unit SAE controls the current $I_L$ which acts upon the light source.

Figure 2:
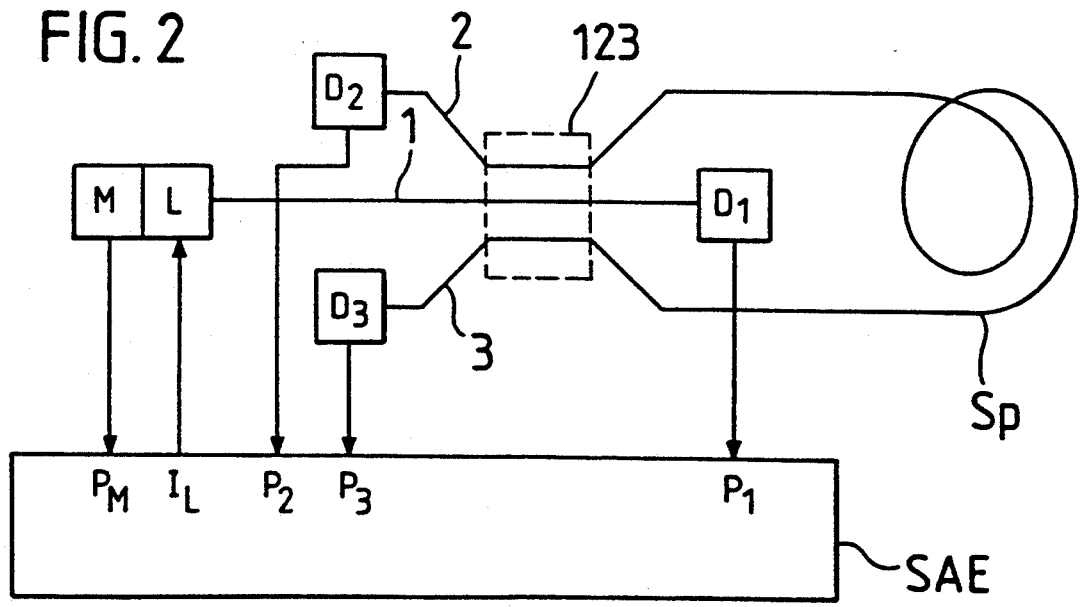
FIG. 2 is a schematic diagram of another embodiment of the fiber.

The embodiment illustrated in FIG. 2 is based on the principle that the center wave length of semiconductor light sources, in addition to the temperature, is also dependent on the injection current. Thus, the control and analysis unit controls the injection current in such a manner that—as will be described in the following—the center wave length of the emitted light is appropriately displaced.

The method of operation of the embodiments illustrated in FIGS. 1 and 2 will now be described:

The transmission characteristics of a $3 \times 3$-coupler, that is, the dividing ratios of the intensity and the relative phase relations of the light waves at the output ducts depend only on the three coupling values $K_{12}L$, $K_{13}L$, $K_{23}L$ (see G. Trommer, *Electron. Lett.* 25, Page 944–945, 1989). In this case, $K_{ij}$ are the coupling constants between the three ducts of the $3 \times 3$-coupler; L is the length of the common coupling path. The $K_{ij}$ depend essentially on the distances of the respective ducts i, j from one another and on the wave length of the light waves coupled into the coupler. The dependence of the effective coupling values $K^L_{ij}$ on the temperature, the pressure, the wave length, etc. can be described by $$K^L_{ij}(a,T,P,\ldots) = K_{ij}(a,T,P,\ldots) \cdot L(T,P,\ldots)$$
$$= (k_{ij} \cdot f(T,P,\ldots) \cdot g(a)) \cdot L(T,P,\ldots)$$

with $$K^o_{ij} = K_{ij}(\lambda_o, T_o, P_o, \ldots)$$

Herein, $Ko_{ij}$ describes the coupling constants for the ducts i,j, with a reference wave length $\lambda_o$, reference temperature $T_o$, reference pressure $P_o$, etc. The environmental dependence of $K_{ij}$ is described by a function $f(T,P,\ldots)$; the wave length dependence is described by $g(\lambda)$, wherein $$f(T_o,P_o\ldots)=1, \ g(\lambda_o)1$$

In this case, it is important that all three ducts i, j have approximately the same dependence $f(T,P,\ldots)$ or $g(\lambda)$, while the possible asymmetry between the ducts is expressed only in the reference values $Ko_{ij}$.

According to the invention, it is recognized that the values $K^L_{ij}$ can be kept constant irrespective of outside influences, such as temperature, pressure, etc. when the following is applied (irrespective of the reference coupling constant $Ko_{ij}$)

$$f(T,P,\ldots) \cdot g(\lambda) \cdot L(T,P,\ldots) = \text{constant} \quad (3)$$

The information concerning the above relationship is obtained from the signal of the measuring detector $D_1$ which is mounted on the exit-side end of the coupling-in light guide 1. This applies to the measured performance $P_1$ $$P_1 = S_1(K_{12}{}^L, K_{13}{}^L, K_{23}{}^L) \cdot I_o \quad (4)$$

i.e., the output signal is a function $S_1$ of the three coupling values $K_{12}{}^L$, $K_{13}{}^L$, $K_{23}{}^L$ and of the light intensity I coupled into the $3 \times 3$-coupler.

The required constancy of Gl(3) is therefore given when the following applies $$\frac{P_1}{I_o} = \text{constant} \quad (5)$$

where $I_o$ is the intensity of light radiated by light source L.

In the case of fluctuations of T, P, . . . , this can be achieved in that the wave length $\lambda$ of the light source is controlled in such a manner that equation (5) is met.

The light source L radiates light of intensity $I_o$ into the duct 1 of the $3 \times 3$-coupler. The fiber-optic coil, as the rotation sensor, is connected with the output ducts 2, 3. The detectors, for example, photodiodes $D_1$, $D_2$, $D_3$ measure the optical signals emitted by the $3 \times 3$-coupler and feed the corresponding electrical signals $P_1$, $P_2$, $P_3$ to a control and analysis unit. The intensity of the light source is measured by means of a monitoring diode M integrated with the light source, the output signal $P_M$ of which is also fed to the control and analysis unit.

The control and analysis unit controls the current $I_L$ of the light source such that the fed back detector signal $P_M$ remains constant. Furthermore, the embodiment shown in FIG. 1 adjusts the control current $I_P$ to control the Peltier element P, which is in thermal contact with the light source L, in such a manner that the resulting adjusted temperature adjusts the gravity center wave length of the emitted light in such a manner that the signal $P_1$ remains constant irrespective of outside influences.

The embodiment shown in FIG. 2 controls the current $I_L$, which acts upon the light source L, in such a manner that the quotient $P_1/P_M$ is constant and equal to a reference value $(P_1/P_M)_o$ which is stored, for example, in a memory of the control and analysis unit.

Although the invention has been described and illustrated in detail, it is to be clearly understood that the same is by way of illustration and example, and is not to be taken by way of limitation. The spirit and scope of the present invention are to be limited only by the terms of the appended claims.

We claim:

1. A Sagnac type fiber-optic gyro comprising:
   a light source;
   a monitoring detector adapted to detect intensity of light emitted by the light source;
   first, second and third light detectors;
   a rotatable light guide fiber coil having an optical fiber with two ends;
   a $3 \times 3$ fiber optic coupler having three optically coupled light guides, each of which has an input end and an output end, a first of said light guides having said light source coupled to its input end and said first light detector coupled to its output end, and said remaining two light guides being coupled at their output ends to the respective ends of said optical fiber of said coil, and their input end coupled to said second and third light detectors respectively;

control and analysis means for determining a rate of rotation of said light guide fiber coil from output signals of said light detectors;

said control and analysis means including means responsive to said output signals for controlling intensity and wave length of light emitted by the light source so that a ratio of an output signal from said first light detector to an output signal from said monitoring detector remains constant.

2. A fiber-optic gyro according to claim 1, wherein the control and analysis unit controls the intensity and the wave length of the light emitted by the light source so that output signals of said first light detector and of the monitoring detector are constant.

3. A fiber-optic gyro according to claim 1, wherein the light source is a semiconductor light source, and a tempering element varies temperature of the semiconductor light source for the variation of the center wave length.

4. A fiber-optic gyro according to claim 2, wherein the light source is a semiconductor light source, and a tempering element varies temperature of the semiconductor light source for the variation of the center wave length.

5. A fiber-optic gyro according to claim 3, wherein the tempering element is a Peltier element.

6. A fiber-optic gyro according to claim 4, wherein the tempering element is a Peltier element.

7. A fiber-optic gyro according to claim 1, wherein the light source is a semiconductor light source, and the control and analysis unit controls injection current for the variation of a wave length of light from the light source.

8. Method of eliminating errors in an output of a Sagnac-type fiber optic gyro of the type having:

a light source;

a monitoring detector adapted to detect intensity of light emitted by the light source;

first, second and third light detectors;

a rotatable light guide fiber coil having an optical fiber with two ends;

a 3×3 fiber optic coupler having three optically coupled light guides, each of which has an input end and an output end, a first of said light guides having said light source coupled to its input end and said first light detector coupled to its output end, and said remaining two light guides being coupled at their output ends to the respective ends of said optical fiber of said coil, and their input ends coupled to said second and third light detectors respectively;

control and analysis means for determining a rate of rotation of said light guide fiber coil from output signals of said light detectors;

said method comprising the steps of:

receiving said output signals from light detectors; and in response to said output signals, controlling intensity of light emitted by the light source so that a ratio of an output signal from said first light detector to an output signal from said monitoring detector remains constant.

* * * * *